UNITED STATES PATENT OFFICE.

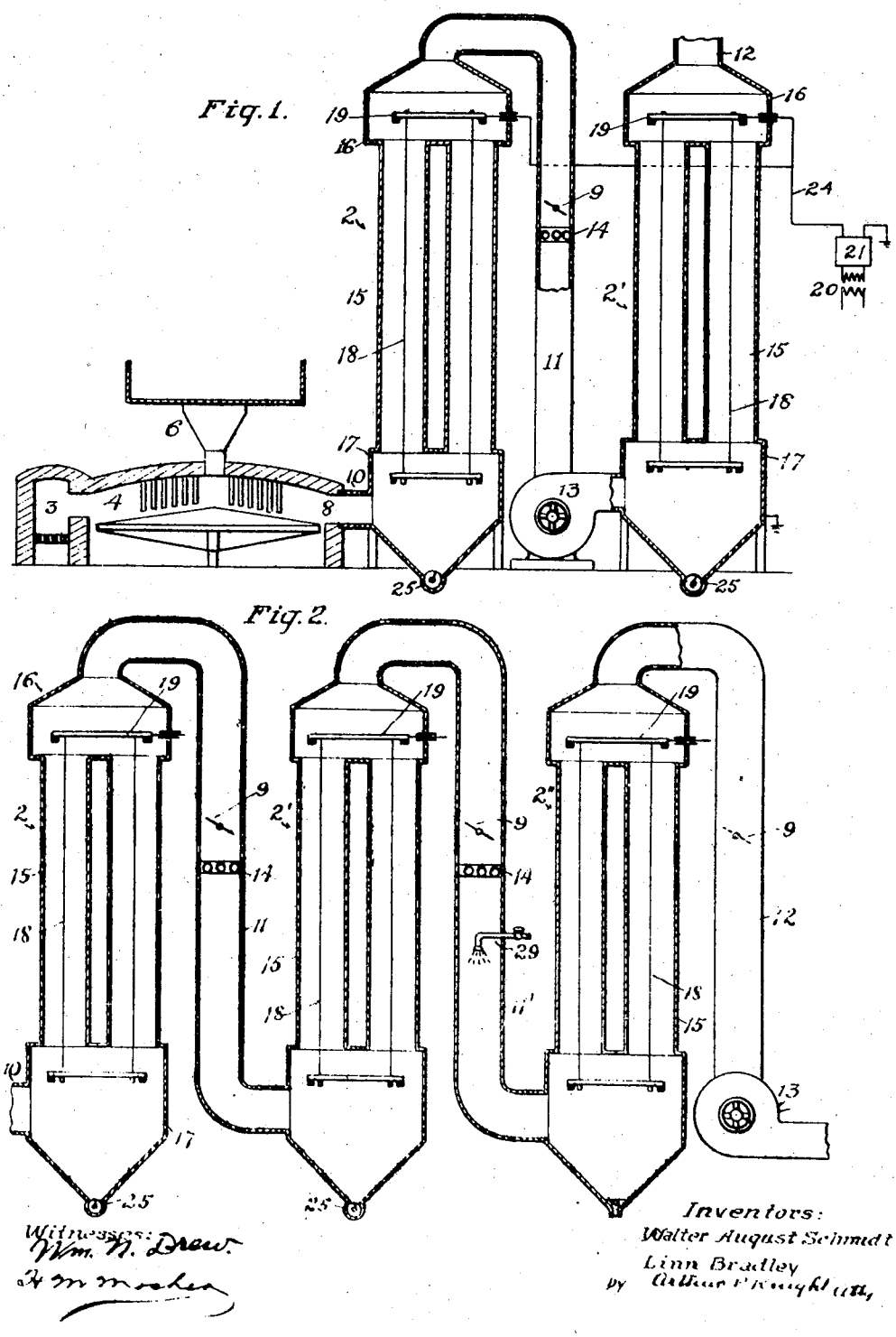

WALTER AUGUST SCHMIDT, OF LOS ANGELES, CALIFORNIA, AND LINN BRADLEY, OF EAST ORANGE, NEW JERSEY, ASSIGNORS TO RESEARCH CORPORATION, OF NEW YORK, N. Y., A CORPORATION OF NEW YORK.

METHOD AND MEANS FOR RECOVERING CERTAIN CONSTITUENTS FROM GASEOUS BODIES.

1,204,906.   Specification of Letters Patent.   Patented Nov. 14, 1916.

Application filed July 23, 1914. Serial No. 852,584.

*To all whom it may concern:*

Be it known that we, WALTER AUGUST SCHMIDT and LINN BRADLEY, citizens of the United States, residing, respectively, at Los Angeles, in the county of Los Angeles and State of California, and at East Orange, in the county of Essex and State of New Jersey, have invented new and useful Methods and Means for Recovering Certain Constituents from Gaseous Bodies, of which the following is a specification.

Our invention relates in general to the separation of various constituents of complex gaseous bodies, and also to the separation of certain constituents of such gaseous bodies from solid or liquid particles carried in suspension by the gaseous bodies. There are many instances in industrial processes where certain gases are liberated from furnaces, retorts, generators etc., such gases consisting of a number of constituents which it would be of advantage to separate, so as to recover valuable constituents from the gases, but such separation and recovery has not been practicable with the methods heretofore proposed. There are also many instances in which such gases carry from the furnace or generator, certain quantities of solid material, such as dust, which it is desirable to separate from the recovered products, so that the latter will be free from such dust or other impurities.

The main object of our invention is to provide for rapid, economical and substantially complete, separation of the different substances contained in a gaseous body of this character.

Our invention is based on the successive precipitation of the constituents of different condensability in the gaseous body, by controlling the temperature thereof, in such manner that the substances of different condensability will be successively brought from a gaseous form to condition of suspended particles forming a cloud and by subjecting the cloud of each substance, as it is condensed, to a precipitating action whereby it is effectively separated from the gaseous body before the condensation of the next succeeding product. It is of the greatest importance that this precipitation of the cloud should be effected quickly and thoroughly, so that each substance being separated may be fully or adequately precipitated before the temperature changes sufficiently to produce a cloud of a substance requiring a lower temperature for its condensation. The usual methods of removal of the suspended particles from the gases, by settling or by washing or scrubbing with liquid are not practicable in such a process of multi-stage separation. Precipitation in settling chambers is so slow and requires such large chambers that it is difficult, if not impossible, to maintain the conditions of temperature uniform throughout any one precipitating stage, with the result that the product corresponding to that stage is contaminated with those of preceding and succeeding stages, and the separation of the constituents of the gaseous body is therefore not sharp and complete. Moreover a succession of such settling operations, in large chambers requires such a large plant as to make the process unduly expensive.
Separation by spraying with liquid is, of course, out of the question, since the resultant cooling of the gaseous body would interfere with the proper control of the temperatures, as required by the process.

We have found that by subjecting the gas to the action of an electric discharge in an electrostatic field, the suspended particles or cloud can be removed or precipitated so quickly and effectively that substantially complete precipitation of any one of the different constituents or substances in the gaseous body may be effected almost instantaneously, and before there is any opportunity for change of the temperature or other conditions, so that a sharp separation of the different constituents or substances may be thereby obtained. Moreover the precipitating operation as so carried out, is so rapid that a number of successive separations may be effected without undue expense, and the process is thereby brought within the limits of commercial practicability.

Our invention consists essentially in subjecting the gaseous body to a succession of electrical precipitating actions with control of temperature, so as to produce, between successive precipitation, a reduction of temperature sufficient to condense, in the form of a cloud mist or fume, one of the constituents of the gaseous body, which is then removed in the next succeeding precipitation.

Our method may be carried out in any apparatus capable of maintaining the requisite conditions of temperature control and of providing for the multi-stage precipitation by electrical action. Suitable forms of apparatus for carrying out the process are illustrated in the accompanying drawings, wherein:

Figure 1 is a vertical section of an apparatus suitable for application of our invention in connection with the recovery of arsenic or other condensable constituent from the flue-gases of an ore roaster, this apparatus being adapted to perform two successive precipitations, for removal, successively, of the solid suspended dust and of the condensable constituent. Fig. 2 is a vertical section of a precipitating apparatus adapted for carrying out our method where a plurality of condensable constituents are to be recovered separately.

Referring to Fig. 1, the apparatus therein shown comprises a roaster or furnace 1, for roasting or heating the flue dust, ore or other material, means for conducting away the gases from such roaster or furnace, and a plurality of precipitating devices 2 and 2' connected to receive such gases and adapted to perform successive precipitating actions thereon. The furnace or roaster may be of any usual or suitable construction, comprising, for example, a combustion chamber 3 and a mechanical roaster-chamber 4, to which the ore, flue dust or other material in a divided condition, is supplied by a hopper or feed means 6.

Suitable pipe connections 10, 11 and 12 are provided for leading the gases from the outlet 8 of the furnace or roaster successively through the precipitators 2 and 2', and from the last precipitator to any suitable flue or stack, a blower 13 being provided at any desired point in such connections for drawing or forcing the gases through the precipitators. A damper 9 is provided in pipe 11 for regulating the intensity of draft, and valved air-inlet means 14 is provided for admitting cool air from the outside to this pipe, so as to properly control the temperature.

Each precipitator comprises a suitable casing or chamber, formed for example, as a series of pipes 15, connected to top and bottom headers 16 and 17, and collecting and discharge electrodes are provided in each precipitator, the pipes 15, for example, constituting the collecting electrodes, and the discharge electrodes consisting of fine wires 18 suspended from insulated supports 19. Connections are made to said electrodes from a source of high tension unidirectional current, for example, a step-up transformer 20 and a rectifier 21 connected therewith, said rectifier and the collecting electrodes having ground connections and the high tension side of the rectifier being connected by a wire 24 to the supports 19 for the discharge electrodes 18. Suitable means 25 are provided at the bottom of each precipitator, for recovering and discharging the precipitated substance.

The following example will serve to illustrate our method, as applied to metallurgical work. In roasting certain ores, having a high arsenic content, gases are given off which contain, among other constituents, the products of combustion, which in most cases will be high in sulfur dioxid, nitrogen, etc., and large quantities of arsenic in the form of volatilized arsenious oxid, which in many cases will be valuable for recovery, if it can be recovered comparatively pure. The gases passing from the roaster also carry large quantities of dust suspended therein and the presence of this dust interferes with recovery of the arsenic in pure condition from the gases, as it tends to contaminate the arsenic product.

Our invention provides for recovery of the arsenic, substantially free from contamination by flue-dust, in the following manner: The ore is heated or roasted in the furnace or roaster 1 and the arsenic content of the ore is thereby carried off, in the form of arsenious oxid, in the gases which pass from the roaster to the first precipitator 2, together with the other products of combustion and with the dust carried over mechanically by the gases. The gases are delivered to the first precipitator at a temperature sufficiently high to maintain the arsenic in a volatilized condition, and such temperature is maintained while the gases are passing through the first precipitator. A sufficient potential difference is maintained between the electrodes of this precipitator, to produce ionization and discharge at the discharge electrodes 18, with the result that the dust particles suspended in the gases are charged and are forced by the action of the electric field between the electrodes to travel toward the collecting electrodes, on which they are precipitated, the dust so precipitated being removed from the electrodes from time to time in any suitable manner. This operation leaves the gases in clean condition, as far as any solid or liquid particles are concerned, and the clean gases then pass through the pipe 11, wherein they are cooled by any suitable means, for example, by admitting cool air from the outside, through the ports or valved inlets 14, so as to reduce the temperature of the gases below the condensation or sublimation point of the arsenic, which then condenses to a mist or cloud of suspended particles. The gases, with the mist of arsenic suspended therein, are then forced by the blower 13 to the second precipitator 2' wherein the arsenic dust or mist is precipitated by electrical action and is recovered substantially free from dust, this precipitated arsenic being removed from the collecting electrodes and from the casing of the precipitator either continuously or from time to time, by any suitable means.

In case the gases being treated contain more than one condensable constituent, our process may provide for successive separation of several different constituents of different condensability. Thus, in the example above given the gases bearing the arsenic in the form of vapor of arsenious oxid, may also contain other substances, for example sulfuric acid, and such other substance or substances may then be separated from the gases by passing the latter through a second cooling means to further reduce the temperature, so as to condense the sulfuric acid or other substance, the gases with the condensed sulfuric acid in the form of mist being then led or drawn through a third precipitator, wherein the sulfuric acid is precipitated. In carrying out this three stage method, the apparatus shown in Fig. 2 may be used, the pipe 10 in this case leading from the roaster or furnace flue to the first precipitator, and the several precipitators 2, 2' and 2'' being connected in series by suitable piping, a blower 13 being provided for forcing or drawing the gases through the apparatus. In some cases, for example in the case of sulfuric acid precipitation, it may be desirable to humidify the gases to facilitate the condensation, and for this purpose the pipe 11' between the second and third precipitating devices may be provided with water supply means 29 for spraying water into the gas, as well as with the air-admission means 14'. In some cases the cooling may be effected by liquid spray alone without air admission, or it may be effected by other means. In carrying out our method in this separation, the dust or solid or liquid suspended matter passing into the apparatus from the roaster or furnace is first precipitated by the action of the first precipitator 2, the gases are then cooled by admission of air in the piping 11, the first condensation product, for example, arsenic, being thereby condensed and immediately thereafter precipitated in the second precipitator 2' and the gas being then further cooled by admission of water or water and air in the piping 11' so as to condense the second condensate, for example, sulfuric acid, which is then precipitated by electrical action in the third precipitator 2''. The sulfuric acid may be drawn off from this precipitator for use, but in some cases the object of the removal of the sulfuric acid from the gases may be only to avoid its presence in the effluent to the atmosphere.

Any other means of cooling the gases to condense a constituent thereof to a cloud or mist, may be used in addition to or instead of the means above described. For example, the gases may be passed through ordinary tubular coolers or heat interchangers operating by conduction or radiation of the heat to the surrounding air or other cooling agent. It will be noted that such a method of cooling does not increase the volume of the containing gas, whereas cooling by admission of air may increase the volume to such an extent as to enable a gaseous constituent having a relatively high vapor tension for the given temperature to be retained in the gas, while another constituent having a lower vapor tension may be condensed. In this way we may provide for separation of constituents which have approximately the same boiling points, provided their vapor tensions slightly below the boiling temperature are markedly different. In such cases the procedure will be to first cool by admission of air, to a temperature somewhat below the boiling point, thereby condensing the constituent of lower vapor tension, but retaining the other constituent in the gas, then precipitating such condensed constituent, and then cooling further by radiation, so as to condense said other constituent and precipitating the latter. This method may also be used for separating gaseous constituents which sublime directly as solids provided their vapor pressure curves have markedly different characteristics.

It will be understood that in carrying out our invention the temperature stages may be so controlled as to separate the several constituents with any desired degree of sharpness, and in case only partial separation is desired, the temperature control will be such as to give the required percentages of the several constituents in each product. Inasmuch as the condensation point for any particular constituent of the gas depends on the pressure, as well as on the temperature, we may provide for control of the successive condensation by varying or controlling the pressure. This may be effected with the apparatus shown, by properly controlling the dampers and inlets, and by controlling the speed of the fan, or it may be effected in other ways. By condensation point or temperature of the gaseous constituent, we mean a temperature at which some condensation thereof, either to solid or to liquid form, will take place.

What we claim is:

1. The method of separating substances of different condensability from gases containing the same, and from one another, which consists in subjecting the gases to a plurality of electrical precipitating actions, and controlling the temperature so as to reduce the temperature between the precipitating actions sufficiently to condense into the form of cloud, one of the constituents of the gas, for precipitation in the next succeeding precipitating action.

2. The method of recovering a condensable constituent from a gas containing the same and also containing suspended particles, which consists in subjecting the gas to the action of an electric discharge in an electric field, to cause precipitation of the suspended particles, then cooling the gas to condense said condensable constituent, in the form of cloud, and then again subjecting the gas to the action of an electric discharge in an electric field, to precipitate the said cloud.

3. The method of recovering certain constituents of gaseous bodies, which consists in the formation of clouds, of the individual materials to be recovered, by cooling the gases below the condensation point of the most condensable constituent but maintaining the temperature above the condensing point of the next most condensable constituent, so as to condense only the most condensable constituent, in the form of cloud, subjecting the gases while maintained at the stated range of temperature, to precipitating action to separate the said cloud therefrom, then reducing the temperature sufficiently to condense only the next most condensable constituent, and precipitating the same while the gas is maintained at such temperature, the operation of cooling, condensation and precipitation being repeated until the required material of lowest condensability has been separated from the gases.

4. The method for separation of dust and fume from certain condensable constituents in gases, which consists in first subjecting the gases to electrical discharge in an electric field to precipitate the dust and fume therefrom, then cooling the gases to such a temperature as to cause condensation only of the most condensable constituent, then subjecting the gas to the action of an electric discharge in an electric field, to precipitate the cloud formed by condensation of such constituent, and repeating the operations of cooling to definite temperatures to form clouds of definite constitution and of precipitation of such clouds, until all the required constituents have been removed from the gases.

5. The method of separating a condensable constituent from a gas, which consists in mixing a cooler gas with the gas to be treated, so as to reduce the temperature of the mixture below the temperature of condensation of such constituent, and thereby cause condensation of such constituent in the form of a cloud, and then passing the gas containing the cloud through an electric field, in which an electric discharge is maintained, to precipitate the cloud from the gas.

6. The method of separating a condensable constituent from a gas, which consists in cooling the gas below the temperature of condensation of such constituent, and simultaneously adding moisture thereto, to humidify the gas and thereby facilitate condensation of said constituent therefrom in the form of a cloud, and then subjecting the gas to electrical precipitating action to precipitate such cloud.

7. An apparatus for recovering certain constituents from gaseous bodies, comprising a plurality of electrical devices for producing electric discharge in an electric field, means for conducting the gas to be treated successively through said electrical devices, and means for reducing the temperature of the gas as it passes from each of said electrical devices to the next electrical device, so as to cool the gas by a plurality of successive steps, the cooling at each step being sufficient to cause some constituent of the gas to be condensed in the form of a cloud, and the cloud so formed being precipitated in the next succeeding electrical device.

8. An apparatus for recovering certain constituents, of different condensability, from a gas, comprising means for successively cooling the gas to temperature at which the respective condensable constituents will condense in the form of a cloud, and electrical precipitating means for precipitating the cloud of condensed constituent from such gas, after each condensation of a constituent therefrom.

9. An apparatus for recovering constituents of different condensability, from a gas, comprising a plurality of cooling devices, for successively cooling the gas to progressively lower temperatures, corresponding to the temperatures of condensation of the respective constituent aforesaid, so as to form at each cooling action a cloud of particles consisting of a constituent of the gas, and a precipitating means connected to receive the gas from each cooling means, to precipitate the cloud therein formed.

WALTER AUGUST SCHMIDT.
LINN BRADLEY.

Witnesses to signature of Walter August Schmidt:
 WM. N. DREW,
 K. M. MOSHER.
Witnesses to signature of Linn Bradley:
 ALFRED H. WHITE,
 J. W. BATTEN.